(12) United States Patent
Critelli et al.

(10) Patent No.: US 11,281,807 B2
(45) Date of Patent: Mar. 22, 2022

(54) PROCESSING SYSTEM, RELATED INTEGRATED CIRCUIT AND METHOD

(71) Applicants: STMicroelectronics (Grenoble 2) SAS, Grenoble (FR); STMicroelectronics S.r.l., Agrate Brianza (IT)

(72) Inventors: Rosalino Critelli, Misterbianco (IT); Giuseppe Guarnaccia, Augusta (IT); Delphine Le-Goascoz, Grenoble (FR); Nicolas Anquet, Grenoble (FR)

(73) Assignees: STMICROELECTRONICS (GRENOBLE 2) SAS, Grenoble (FR); STMICROELECTRONICS S.R.L., Agrate Brianza (IT)

( * ) Notice: Subject to any disclaimer, the term of this patent is extended or adjusted under 35 U.S.C. 154(b) by 398 days.

(21) Appl. No.: 16/403,275

(22) Filed: May 3, 2019

(65) Prior Publication Data
US 2019/0354726 A1    Nov. 21, 2019

(30) Foreign Application Priority Data

May 18, 2018  (IT) ................. 102018000005506

(51) Int. Cl.
| | |
|---|---|
| *G06F 21/72* | (2013.01) |
| *G06F 3/06* | (2006.01) |
| *G06F 11/10* | (2006.01) |
| *G06F 13/16* | (2006.01) |
| *G06F 21/57* | (2013.01) |

(Continued)

(52) U.S. Cl.
CPC ............ *G06F 21/72* (2013.01); *G06F 3/0619* (2013.01); *G06F 3/0623* (2013.01); *G06F 3/0659* (2013.01); *G06F 3/0679* (2013.01); *G06F 11/1004* (2013.01); *G06F 13/1668* (2013.01);
(Continued)

(58) Field of Classification Search
CPC ........ G06F 21/72; G06F 21/572; G06F 21/85; G06F 3/0619; G06F 3/0623; G06F 3/0659; G06F 3/0679; G06F 11/1004; G06F 13/1668; H04L 9/0894
See application file for complete search history.

(56) References Cited

U.S. PATENT DOCUMENTS

| | | | |
|---|---|---|---|
| 6,191,614 B1 * | 2/2001 | Schultz ................. | H03M 13/09 326/38 |
| 2011/0161784 A1 * | 6/2011 | Selinger .............. | G06F 11/1016 714/768 |

(Continued)

FOREIGN PATENT DOCUMENTS

| | | |
|---|---|---|
| EP | 3537330 A1 | 9/2019 |
| IT | 201800003373 A1 | 9/2019 |

*Primary Examiner* — Hee K Song
(74) *Attorney, Agent, or Firm* — Slater Matsil, LLP

(57) ABSTRACT

In one example, an integrated circuit includes a register interface that includes a plurality of registers, a bus interface configured to monitor write requests transmitted to the register interface, where the write requests include a target address and data to be written. The bus interface is configured to receive the data to be written to the plurality of registers and register selection signals for selecting a respective register in the plurality of registers. The integrated circuit includes a monitoring circuit configured to monitor the register selection signals between the bus interface and the plurality of registers in order to determine when the data to be written to the plurality of registers is valid.

19 Claims, 6 Drawing Sheets

(51) Int. Cl.
*G06F 21/85* (2013.01)
*H04L 9/08* (2006.01)
(52) U.S. Cl.
CPC ............ *G06F 21/572* (2013.01); *G06F 21/85* (2013.01); *H04L 9/0894* (2013.01)

(56) References Cited

U.S. PATENT DOCUMENTS

| | | | |
|---|---|---|---|
| 2016/0117217 A1* | 4/2016 | Anand | G06F 11/1004 714/57 |
| 2018/0121282 A1* | 5/2018 | Barrilado Gonzalez | G06F 11/1004 |
| 2019/0245686 A1* | 8/2019 | Rahimi | G06F 21/86 |
| 2019/0278516 A1* | 9/2019 | Rowley | G11C 5/147 |

* cited by examiner

PROCESSING SYSTEM, RELATED INTEGRATED CIRCUIT AND METHOD

CROSS-REFERENCE TO RELATED APPLICATIONS

This application claims the benefit of Italian Patent Application No. 102018000005506, filed on May 18, 2018, which application is hereby incorporated herein by reference.

TECHNICAL FIELD

The present invention relates generally to a processing system, and, in particular embodiments, to a processing system, related integrated circuit and method.

BACKGROUND

FIG. 1 shows a typical digital processing system 10, such as embedded system or integrated circuit, e.g., a Field Programmable Gate Array (FPGA), Digital Signal Processor (DSP) or a micro-controller (e.g., dedicated to the automotive market).

In the example considered, the processing system 10 comprises at least one processor 102, such as a microprocessor, usually the Central Processing Unit (CPU), programmed via software instructions. Usually, the software executed by the processor 102 is stored in a program memory 104, such as a non-volatile memory, such as a Flash memory or EEPROM. Generally, the memory 104 may be integrated with the processor 102 in a single integrated circuit, or the memory 104 may be in the form of a separate integrated circuit and connected to the processor 102, e.g. via the traces of a printed circuit board. Thus, in general the memory 104 contains the firmware for the processor 102, wherein the term firmware includes both the software of a micro-processor and the programming data of a programmable logic circuit, such as a FPGA.

Generally, the processor 102 and the memory 104 may exchange data via any suitable communication systems, for example a bus system 120.

In the example considered, the processor 102 may have associated one or more resources.

For example, in FIG. 1 is shown a cryptographic co-processor 108, which may be used to encrypt and/or decrypt data. Specifically, in the example considered, the cryptographic co-processor 108 comprises a cryptographic processing circuit 112 and a register interface 110. Specifically, the cryptographic processing circuit 112 is usually arranged to process data, such as to encrypt or decrypt data, by means of one or more cryptographic keys. Accordingly, the register interface 110 may be used to provide the following data to the cryptographic processing circuit 112: the one or more cryptographic keys; and data identifying the data to be processed, such as directly the data to be processed or an address to a memory location (e.g. in the volatile memory 114) containing the data to be processed.

Other possible resources 106 may include one or more of the following: a communication interface 106a for connecting and internal or external memory 104 to the bus system 120; one or more further communication interfaces 106b, such as Universal asynchronous receiver/transmitter (UART), Serial Peripheral Interface Bus (SPI), Inter-Integrated Circuit (I2C), Controller Area Network (CAN) bus, Ethernet, and/or debug interfaces; and/or one or more analog-to-digital and/or digital-to-analog converters 106c; and/or one or more dedicated analog and/or digital hardware circuits 106d, such as: one or more dedicated digital components, such as hardware timers and/or counters; and/or one or more analog components, such as comparators, sensors, such as a temperature sensor, etc.; and/or one or more mixed signal components, such as a PWM (Pulse-Width Modulation) driver.

Accordingly, the digital processing system 10 may support different functionalities. For example, the behavior of the processor 102 is determined by the firmware stored in the memory 104, e.g., the software instructions to be executed by the processor 102. Thus, by installing a different firmware, the same hardware (micro-controller) can be used for different applications.

In many applications indeed two firmwares are used: a boot firmware (so called bootloader) BL, which is run at the start of the processing system and used to initialize/set-up the processing system 10; and an application firmware FW, which is run once the boot firmware has been executed.

For example, the boot firmware may be used to configure the various resources 106.

Specifically, the boot firmware BL may be used to provide the one or more cryptographic keys to the cryptographic co-processor 108, i.e. the bootloader BL comprises software instructions for storing one or more cryptographic keys to the register interface 110. Conversely, once the application firmware FW is started, this firmware FW may use the cryptographic co-processor 108 for processing data, i.e. the firmware FW comprises one or more software instructions for requesting the execution of one or more cryptographic processing operations provided by the co-processor 108, which in turn use the one or more cryptographic keys already stored to the register interface 110. Accordingly, in this way the application firmware FW does not contain itself the one or more cryptographic keys. For example, this has the advantage that the application firmware FW may be updated without having to include the one or more cryptographic keys within the application firmware FW.

Often the register interface 110 is configured such that the one or more cryptographic keys may be writing to respective register positions, but the corresponding register positions may not be read, i.e. the register interface 110 is configured to inhibit accesses of the application firmware FW to the locations containing the one or more cryptographic keys. Accordingly, in this way, the application firmware FW may also not access the one or more cryptographic keys stored to the register interface 110.

The solution shown in FIG. 1 provides thus an efficient solution in order to maintain secret the one or more cryptographic keys, insofar as the application firmware FW is unable to access the one or more cryptographic keys. In fact, usually also the bootloader BL is stored in memory locations within the non-volatile memory 104 which are not accessible by the application firmware FW, i.e. the processing system 10 is configured to inhibit accesses of the application firmware FW to the memory locations in the memory 104 containing the bootloader BL.

SUMMARY

Embodiments of the present disclosure relate to processing systems, such as microcontrollers, having a cryptographic co-processor.

The inventors have observed that such a strict separation of the configuration phase of the one or more cryptographic keys via the bootloader from the application firmware may generate also some problems. For example, the application firmware FW is unable to verify whether the one or more cryptographic keys have been loaded correctly to the register interface 110.

In view of the above, various embodiments of the present disclosure provide solutions for verifying/validating a security configuration including one or more cryptographic keys.

One or more embodiments achieve this by means of a processing system having the features specifically set forth in the claims that follow. Embodiments moreover concern a related integrated circuit and method.

The claims are an integral part of the technical teaching of the disclosure provided herein.

As mentioned before, various embodiments of the present description relate to a processing system. In various embodiments, the processing system comprises a bus system, a processing unit connected to the bus system and a non-volatile memory configured to store at least one firmware to be executed by the processing unit.

In various embodiments, the processing system, such as an integrated circuit, comprises also a co-processor connected to the bus system, wherein the co-processor comprises a register interface comprising a plurality of registers and a processing circuit configured to perform at least one processing operation as a function of data stored to the plurality of registers. Specifically, the plurality of registers comprise a first set of registers configured to store a first set of configuration information and a second set of registers configured to store a second set of configuration information.

For example, in various embodiments, the processing circuit is a cryptographic processing circuit configured to perform cryptographic operations as a function of at least one cryptographic key. In this case, the first set of registers may be arranged to store the at least one cryptographic key. Conversely, the second set of register may comprise at least one register for storing the data to be processed by the cryptographic processing circuit and/or at least one register for storing an address containing the data to be processed by the cryptographic processing circuit.

For example, in various embodiments, the co-processor has associated a communication interface for interfacing a (e.g. external) memory with the bus system. In this case, the co-processor may be configured to analyze the communication exchanged between the memory and the bus system via the communication interface in order to detect a read operation to a given memory location belonging to a given memory area of the memory. Specifically, in this case, the co-processor may read via the communication interface the data stored to the given memory location from the memory and decrypt the data read with a cryptographic key stored in the first set of registers. For example, in this way an encrypted application firmware may read from the memory, decrypted by the co-processor and executed by the processing unit.

In various embodiments, the configuration of the first set of registers is performed by a hardware or software bootloader. In this case, in order to inhibit an access to the first set of register, the register interface may be configured to selectively inhibit write and/or read accesses to the first set of registers as a function of a lock signal. For example, the lock signal may be set by the hardware or software bootloader.

Accordingly, in this way, the data written to the first set of registers cannot be verified. Similarly, when an incorrect configuration has been stored to the first set of registers, it may be impossible to decrypt the application firmware.

In order to still permit a verification of the configuration, in various embodiments, the register interface is arranged to compute a cyclic redundancy check value as a function of the data written at least to the first set of registers.

Specifically, in various embodiments, the register interface comprises a bus interface configured to monitor write requests transmitted via the bus system to the register interface. Specifically, the write requests comprise a target address and data to be written, wherein with each register of the plurality of registers is associated a respective address. Accordingly, the bus interface may be configured to set for each register of the plurality of registers a respective register selection signal when the target address of a write request corresponds to the address associated with the respective register, wherein each register is configured to store the data to be written when the respective register selection signal is set. Moreover, the register interface comprises a cyclic redundancy check calculation circuit configured to compute a cyclic redundancy check value at least as a function of the data to be written to the first set of registers. Accordingly, by verifying the cyclic redundancy check value it is possible to verify whether the data stored to the first set of registers are valid.

In various embodiments, access to the cyclic redundancy check value is limited by a masking circuit. Specifically, in various embodiments, the masking circuit is configured to monitor the register selection signals associated with the registers of the first set of registers in order to determine the sequence of registers to which data has been stored. Next the masking circuit compares the sequence of registers with a reference sequence. When the comparison indicates that the sequence of registers corresponds to the reference sequence, the masking circuit may provide the computed cyclic redundancy check value to the bus interface. Conversely, when the comparison indicates that the sequence of registers does not correspond to the reference sequence, the masking circuit may inhibit access to the computed cyclic redundancy check value and provide a value being independent from the computed cyclic redundancy check value, such as a fixed default value or a random value, to the bus interface.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
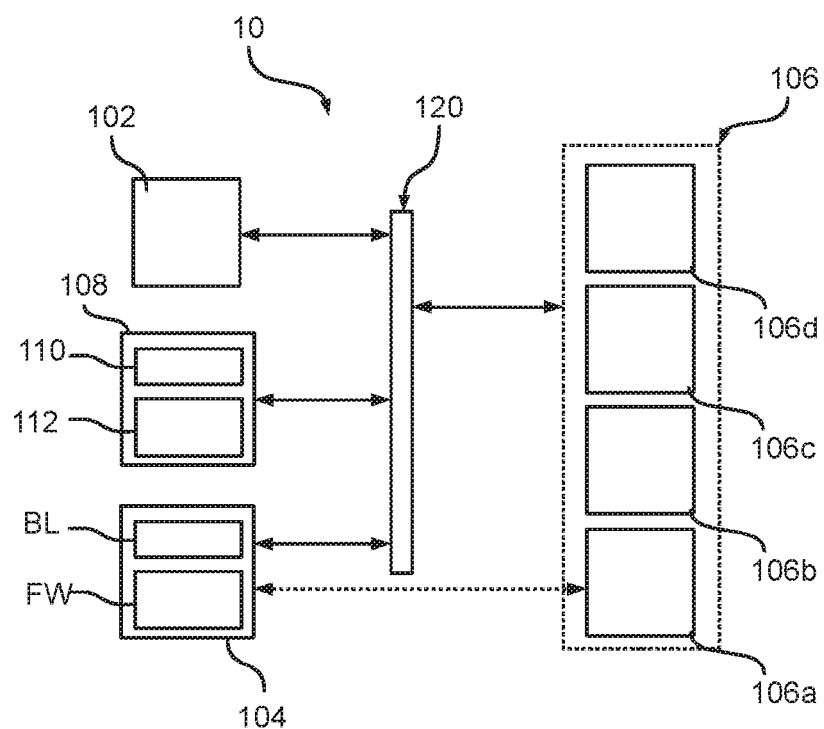
FIG. 1 shows an example of an electronic processing system.

In the following FIGS. 2 to 7 parts, elements or components which have already been described with reference to FIG. 1 are denoted by the same references previously used in such Figures; the description of such previously described elements will not be repeated in the following in order not to overburden the present detailed description.

As described in the foregoing with respect to FIG. 1, a typical processing system 10a includes: a processor 102, such as a microprocessor, such as a STM32 based microprocessor; a non-volatile memory 104 configured to store the firmware for the processor 102; and a cryptographic co-processor 108.

Optionally, the processing system 10 may also include one or more further resource 106. Accordingly, the general description of FIGS. 1 and 2 fully applies to a processing system in accordance with the present description.

Figure 2A:
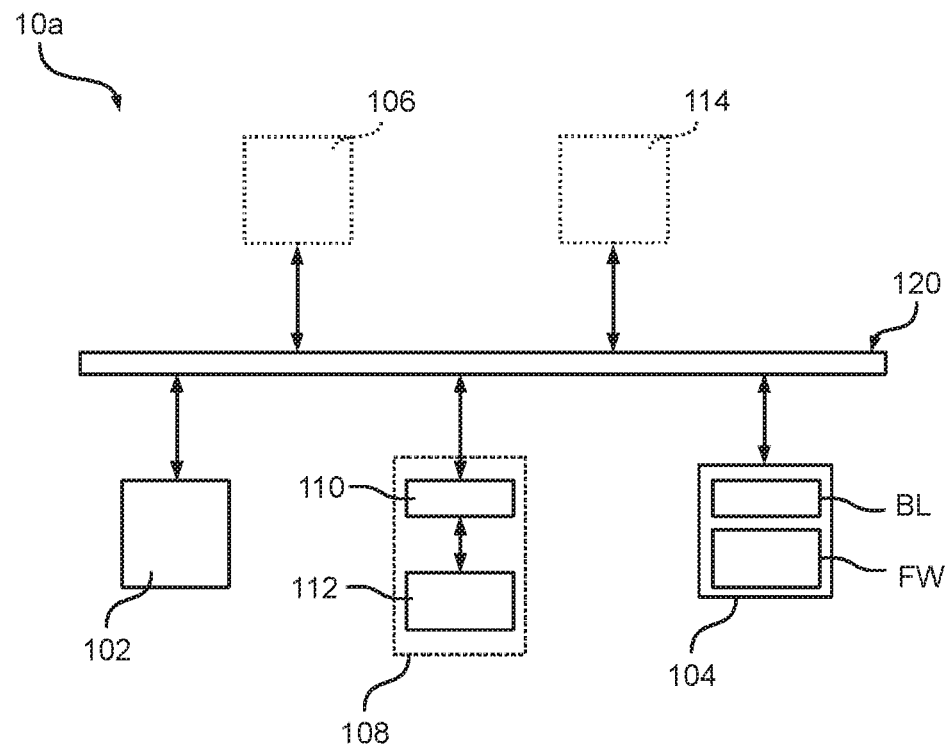
FIGS. 2a to 2c show embodiments of an electronic processing system comprising a cryptographic coprocessor comprising a register interface and a processing circuit.

FIG. 2a shows a first embodiment of a processing system 10a. In the embodiment considered, the processing system 10a comprises also a volatile memory, such as a Random-Access Memory (RAM), used to store temporary results of the processing of the processor 102 and/or the co-processor 108.

In the embodiment considered, the various blocks 102, 104, 106, 108 and 114 are connected to a bus system 120 comprising one or more communications buses, such as an Advanced Microcontroller Bus Architecture (AMBA) or AMBA High-performance Bus (AHB). For example, many STM32 base microcontrollers comprise a bus matrix, such as a AHB bus matrix. Specifically, in this case the bus system 120 comprises a plurality of communication buses and each component may be connected selectively to one or more of these communication buses. For example, in this way may be implemented parallel communications, e.g. for implementing a Direct Memory Access (DMA) to the memory 114 via a first bus, while commands are exchanged via a second bus.

In the embodiment considered, the cryptographic co-processor 108 comprises a cryptographic processing circuit 112 and a register interface 110a. Specifically, in the embodiment considered, the cryptographic processing circuit 112 is configured to process data, such as to encrypt or decrypt data, by means of one or more cryptographic keys. Conversely, the register interface 110a is arranged to provide the following data to the cryptographic processing circuit 112: —the one or more cryptographic keys; and—data identifying the data to be processed, such as directly the data to be processed or an address to a memory location (e.g. in the volatile memory 114) containing the data to be processed.

In the embodiment considered, the above blocks are connected to each other via a bus system 120 comprising one or more communication buses, such as one or more AHB buses.

As mentioned before, in various embodiments, the cryptographic co-processor 108 comprises: a register interface 110 configured to receive configuration data and to provide status data for verifying/validating the configuration via the bus system 120; and a hardware cryptographic processing circuit 112, configured to perform one or more respective processing operations as a function of the configuration data provided to the register interface 110.

Figure 2B:
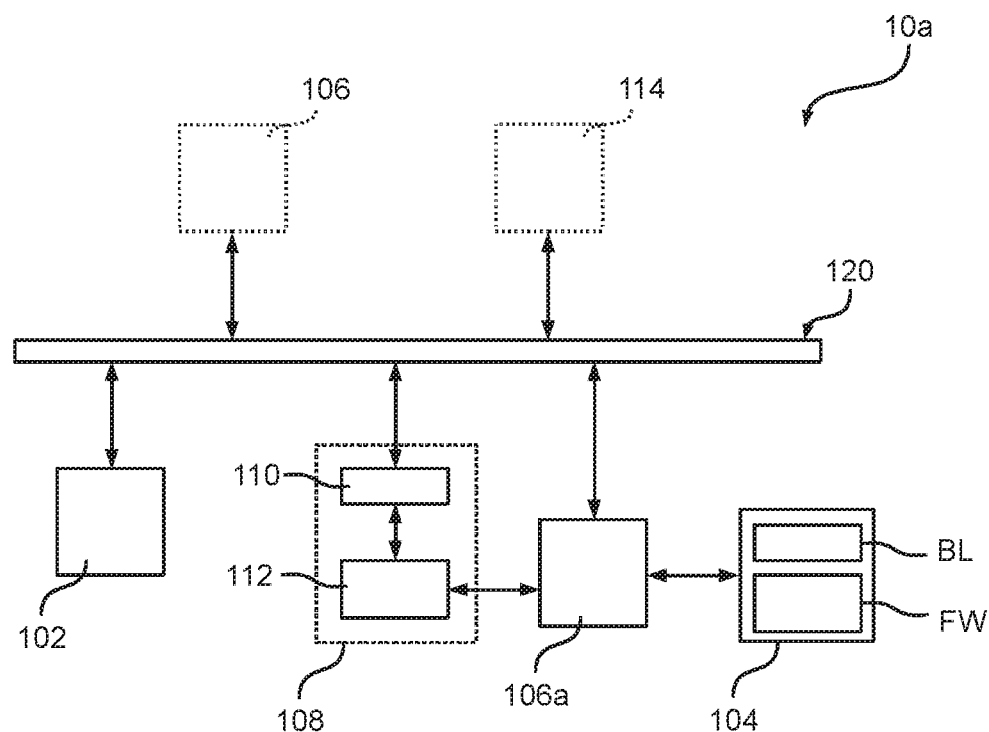

FIG. 2b shows a second embodiment of the processing system 10a. Specifically, in the embodiment considered, the (internal or external) memory 104 is connected to the bus system 120 via a communication interface 106a. For example, the interface 106a may be configured to convert AHB communication of the bus system 120 into External Memory InterFace (EMIF) communications of the memory 104.

Moreover, FIG. 2b shows that the cryptographic co-processor 108 may use the interface 106a to access the memory 104. Specifically, in the embodiment considered, the register interface 110a may be used to configure one or more memory regions in the memory 104 (e.g. by specifying respective start and end addresses) which may contain encrypted data. Moreover, when performing a read request to the memory 104 via the co-processor 108, the co-processor 108 may analyze the communication. For example, such read requests may be stored via the bus system 120 to the register interface 110 of the co-processor 108. Specifically, when the co-processor 108 detects a read access to a memory address not belonging to one of these memory regions (e.g. by comparing the respective address with the start and end address of the memory regions), the co-processor 108 may forward the read request via the communication interface 106a to the memory 104 and return the data read from the memory 104 to the bus system 120. Conversely, when the co-processor 108 detects a read access to a memory address belonging to one of these memory regions (e.g. by comparing the respective address with the start and end address of the memory regions), the co-processor 108 may forward the read request via the interface 106a to the memory 104. However, the (encrypted) data read from the memory 104 are not transmitted directly to the bus system 120, but the cryptographic processing circuit 112 is used to decrypt the data read from the memory 104 and the decrypted data are returned to the bus system 120. Accordingly, once having specified the one or more memory regions, the data decryption is transparent to the processor 102.

Similarly, the co-processor 108 may analyze the communication exchanged and via the communication interface 106a between the bus system 120 and the memory 104/104b in order to detect a write operation to a given memory location belonging to a given memory area of the memory 104/104b. In this case, the co-processor 108 may encrypt the data received via the write operation with a cryptographic key and store the encrypted data via the communication interface 106a to the given memory location.

For example, such a solution is described in Italian patent application 102018000003373, which is incorporated herein by reference.

Figure 2C:
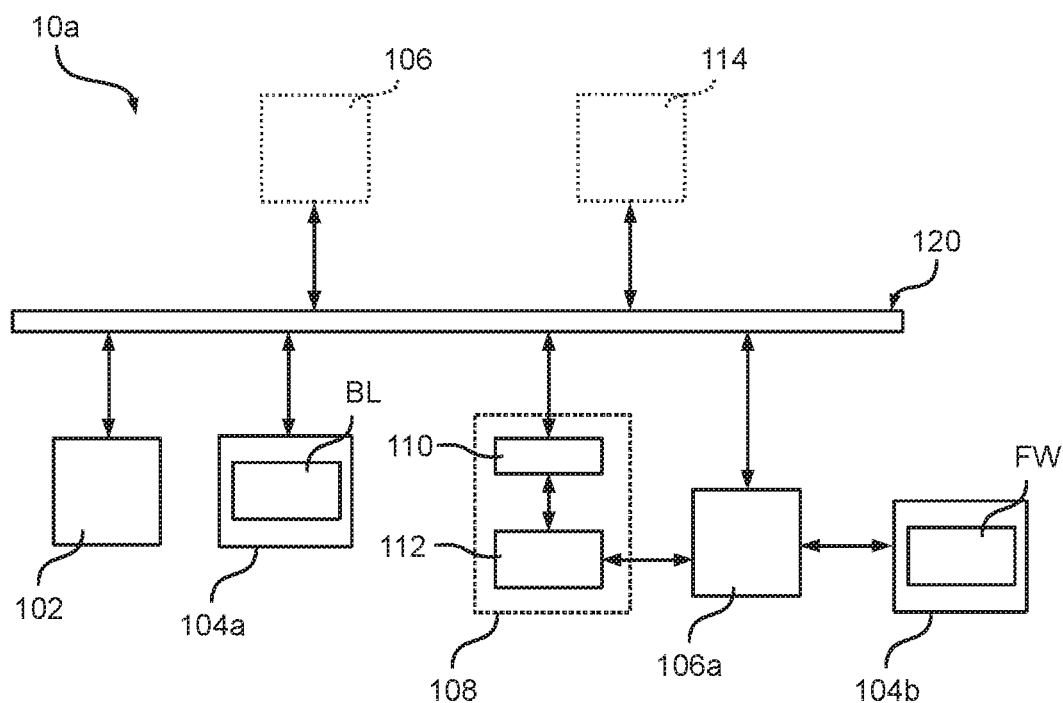

FIG. 2c shows that the above embodiments may also be combined. Specifically, in the embodiment considered, in line with FIG. 2a, a first memory 104a (e.g. an internal memory) is connected directly to the bus system 120.

Moreover, in line with FIG. 2b, a second memory 104b, (e.g. an external memory) is connected via co-processor 108 and the interface 106a to the bus system 120. Accordingly, in this way, the memory 104b (or at least given memory areas thereof) may contain encrypted data and the interface 106a together with the cryptographic co-processor 108 may be used to decrypt these data.

In the embodiment shown in FIGS. 2a and 2b, the memory 104 may thus comprise a boot firmware/bootloader BL and an application firmware FW. For example, this may be useful when a single (e.g. integrated) non-volatile memory 104 is used. Conversely, in the embodiment shown in FIG. 2c, the processing system 10a may be arranged to store the boot firmware/bootloader BL in the (e.g. internal) memory 104a and the application firmware FW in the (e.g. external) memory 104b.

Specifically, also in this case, the boot firmware BL may be used to provide the one or more cryptographic keys to the cryptographic co-processor 108, i.e. the bootloader BL comprises software instructions for storing one or more cryptographic keys to the register interface 110. Conversely, once the application firmware FW is started, this firmware FW may use the cryptographic co-processor 108 for processing data, i.e. the firmware FW comprises one or more software instructions for requesting the execution of one or more cryptographic processing operations provided by the co-processor 108, which in turn uses the one or more cryptographic keys already stored to the register interface 110. Accordingly, in this way the application firmware FW does not contain itself the one or more cryptographic keys. For example, this has the advantage that the application firmware FW may be updated without having to include the one or more cryptographic keys within the application firmware FW.

Moreover, in the embodiment shown in FIGS. 2b and 2c, also the application firmware itself may be stored in encrypted form. Specifically, by configuring the memory area (in the memory 104 or the memory 104b) arranged to store the application firmware FW in the register interface 110, the co-processor 108 will automatically decrypt the application firmware FW while reading the firmware FW from the memory 104 (FIG. 2b) or 104b (FIG. 2c) via the interface 106a. Accordingly, in this way, the application firmware FW may be maintained secret and a certified application firmware (encrypted with the correct cryptographic key) may be executed by the processor 102. For example, this may be particularly useful for the arrangement shown in FIG. 2c, in which the memory 104b may be external to the integrated circuit comprising the other components (102, 104a, 106, 108, 114, 120) of the processing system 10a, insofar as it may be rather easy to intercept/modify the communication between the interface 106a and an external memory 104b.

Accordingly, the interface 106a is configured to interface the memory 104/104b with the bus system 120. However, in the embodiments considered, the co-processor 108 operates like a sniffer of the traffic passing to the memory 104/104b, possibly intercepting the communication in order to decrypt the data read from the memory 104/104b. Thus, in general, the co-processor 108 may be used also to interface other resources and not only memories.

Figure 3A:
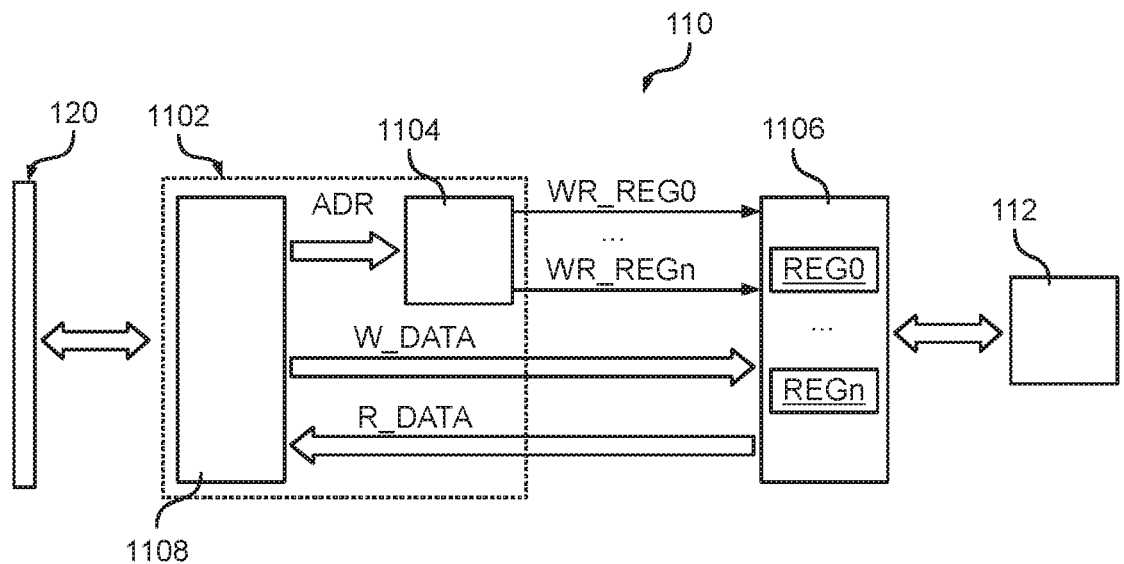
FIGS. 3a and 3b show embodiments of the register interface of FIGS. 2a to 2c.

FIG. 3a shows a possible embodiment of the register interface 110 of the co-processor 108.

In the embodiment considered, the register interface 110 comprises a register bank 1106 comprising a plurality of registers REG0 . . . REGn. For example, each register REG0 . . . REGn may comprises a given number of bits, such as 16, 32 or 64 bits.

Moreover, in the embodiment considered, the register interface 110 comprises a bus interface 1102 configured to manage the data exchange between the bus system 120 and the register bank 1106.

For example, as schematically shown in FIG. 3a, the bus interface 1102, such as a AHB interface, may comprise a first circuit 1108 configured to monitor write requests sent via the bus system 120 to the register interface 110. In response to a write request, the first circuit 1108 may provide an address signal ADR to an address decoder 1104 and a data signal W_DATA to the register bank 1106.

For example, the address decoder 1104 may be configured to generate a plurality of register selection signals WR_REG0 . . . WR_REGn, one for each of the registers REG0 . . . REGn, as a function of the address signal ADR. For example, in this way, a respective address may be associated with each of the registers REG0 . . . REGn and the address decoder 1104 may set the respective register selection signal WR_REG0 . . . WR_REGn to a given logic level (usually high), when the value of the address signal ADR corresponds to the address associated with the respective register REG0 . . . REGn.

Accordingly, when the register selection signals WR_REG0 . . . WR_REGn associated with a given register REG0 . . . REGn is set to the given logic level (e.g. high), the respective register may store data provided via the signal W_DATA. Accordingly, usually the registers REG0 . . . REGn have the same number of bits as (or possibly less than) the data signal W_DATA.

In various embodiments, the register interface 110 may also support read requests. Specifically, in response to a read request, the first circuit 1108 may again provide the address signal ADR to an address decoder 1104, which thus may again set one of the register selection signals WR_REG0 . . . WR_REGn to the given logic value when the address corresponds to the address associated with a respective register REG0 . . . REGn. Accordingly, in the embodiment considered, a signal R_DATA is set to the content of the register REG0 . . . REGn for which the register selection signals WR_REG0 . . . WR_REGn has the given logic value. For example, a multiplexer may be used for this purpose. Those of skill in the art will appreciate that usually an additional signal WR is used to signal whether a read or write operation has to be performed. Alternatively, separate register selection signals may be used for read and write operations, or each register selection signal WR_REG0 . . . WR_REGn may comprise two bits.

In the embodiment considered, the first circuit 1108 may thus be configured to monitor read requests sent to the register interface 110, generate via the address decoder 1104 one of the register selection signals WR_REG0 . . . WR_REGn and provide the data R_DATA selected via the register selection signals WR_REG0 . . . WR_REGn to the bus 120.

Generally, the read operations are purely optional and the register interface 110 could also support only write operations or only a sub-set of the register REG0 . . . REGn may support a read operation. In fact, from a security point of view, a read access to security related configuration data stored in the registers REG0 . . . REGn should be inhibited.

Figure 3B:
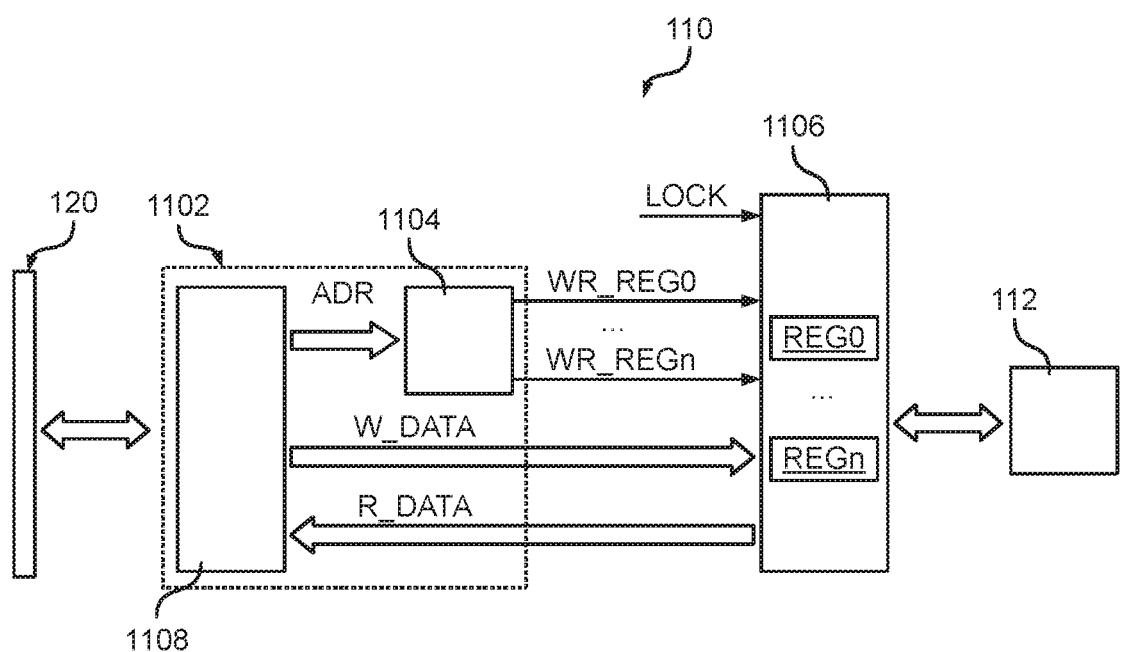

FIG. 3b shows a modified embodiment, wherein the register bank 1106 receives at input a lock signals LOCK.

Specifically, in various embodiment, the registers REG0 . . . REGn comprises at least two groups of registers:

a first group of registers configured to store security configuration information, including one or more cryptographic keys; and a second group of registers configured to store data identifying the data to be processed and (in case plural operations are supported by the cryptographic processor 108) the operation to be performed.

Accordingly, the lock signal LOCK may be used to signal to the register interface 110 whether write and/or read accesses are permitted to the first group of registers having stored the security configuration information, in particular the cryptographic keys.

For example, in the embodiment considered, the lock signal LOCK comprises a single global lock bit, which disables write accesses (and if supported also read accesses) to all registers of the first group of registers. However, in general, the lock signal LOCK may also comprise a plurality of bits for: disabling separately write and read accesses, respectively, e.g. by using two separate bits; and/or disabling separately access to sub-sets of the registers of the first group of registers.

For example, in various embodiments, each register of the first group of registers may have associated: a single bit for disabling both write and read accesses to the respective register; or two respective bits for disabling write and read accesses to the respective register, respectively.

Accordingly, in various embodiments, the register interface 110, e.g. the register bank 1106, is configured to selectively inhibit read and/or write operations as a function of the LOCK signal, thereby limiting access the registers configured to store security configuration information.

Based on the specific implementation, the lock signal LOCK may be set in various ways, such as: by using one or more bits in one or more registers REG0 . . . REGn of the register bank 1106, e.g. by assigning a respective register and a respective address to the lock signals LOCK; by including the one or more lock signals in the header information of the communications exchanged via the bus system 120.

As described with respect to FIGS. 2a to 2c, the processing system 10a, in particular the processor 102, may be configured to support two firmwares: a bootloader firmware BL executed once the processing system 10 is switched on; and an application firmware FW executed once the execution of the bootloader firmware BL has terminated.

For example, in order to execute the application firmware, the last instruction of the bootloader firmware BL may be a jump instruction to a given memory address, corresponding to the first address of the application firmware FW.

As described in the foregoing, in this case, the bootloader BL may comprise software instructions for storing one or more cryptographic keys to the interface 110. Moreover, when using the architectures shown in FIGS. 2b and 2c the bootloader BL may comprise software instructions for configuring via the register interface 110 the memory ranges possibly comprising encrypted data, e.g. the memory areas for storing an encrypted application firmware.

Figure 4:
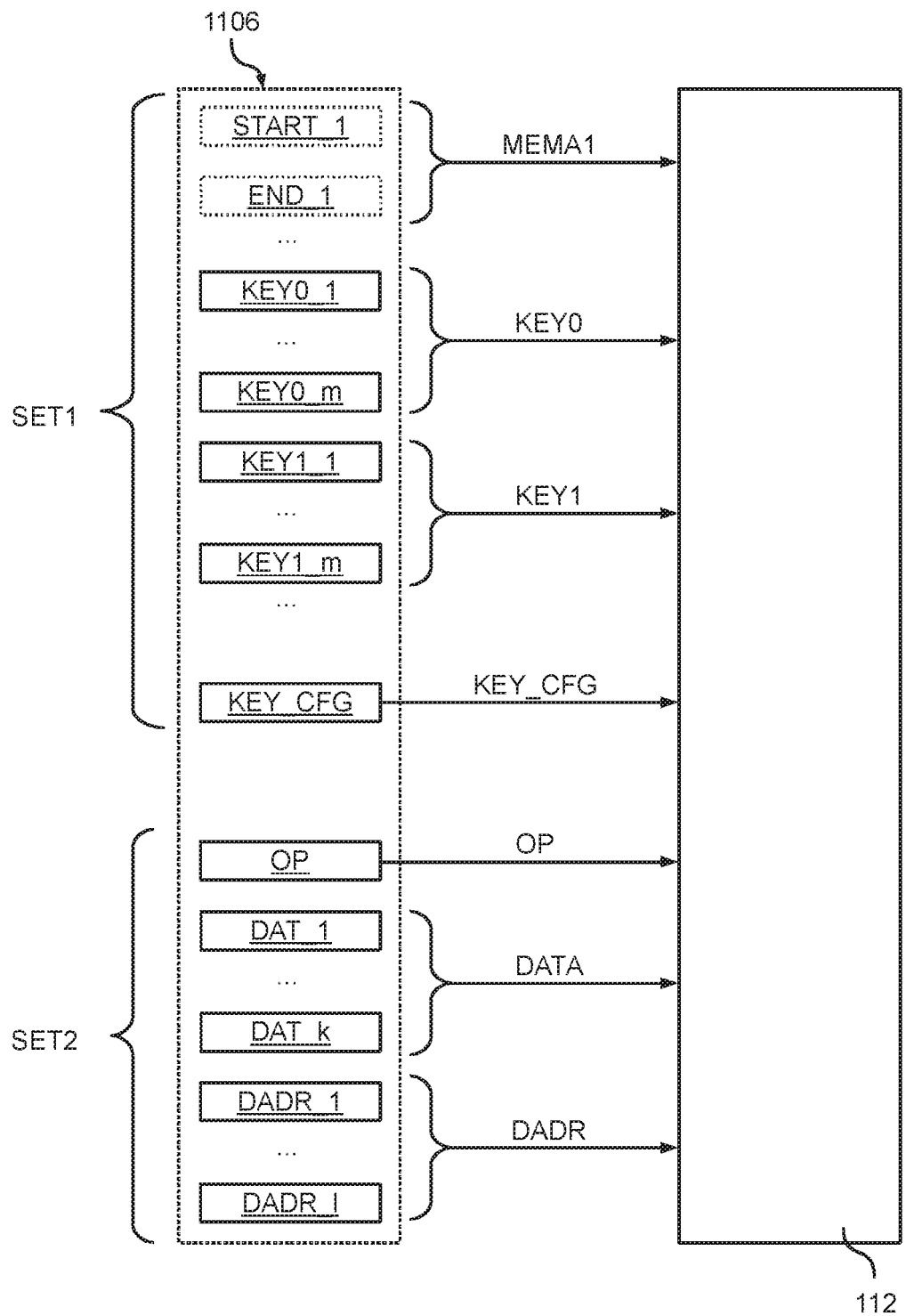
FIG. 4 shows an embodiment of the register interface of FIG. 3a or 3b.

For example, FIG. 4 shows an embodiment of the organization of the registers REG0 . . . REGn of the register bank 1106.

Specifically, in the embodiment considered, the register bank 1106 comprises a plurality of registers configured to store at least one cryptographic key KEY.

Specifically, cryptographic keys have usually 128 bits, or multiples thereof, such as 256, 512 or 1024 bits. Conversely typical processors 102 are based on 32 or 64-bit communications. Accordingly, each cryptographic key may be stored by writing sequentially the bits of the cryptographic key to plural registers. Preferably, the registers have sequential addresses.

For example, in the embodiment considered the register bank 1106 comprises at least a first set of registers KEY0_1 . . . KEY0_m for storing a first cryptographic key KEY0 and a second set of registers KEY1_1 . . . KEY1_m for storing a second cryptographic key KEY1. Generally, the register bank 1106 may also comprise further registers for storing further cryptographic keys.

Generally, the cryptographic keys may have associated also further security configuration data, such as configuration data specifying the operations, which may be performed with a given cryptographic key. For example, in the embodiment considered, these configuration data are stored in one or more registers KEY_CFG. General, these configuration data may also be stored together with the cryptographic key.

When using the architectures shown in FIG. 2b or 2c, the register bank 1106 may also comprise one or more register for specifying the memory areas MEMA, which should be decrypted automatically when performing a read operation to a memory location belonging to the respective memory area MEMA. For example, in the embodiment considered, the register bank 1106 comprises one or more registers START_1 for specifying a first memory start address and comprises one or more registers END_1 for specifying a first memory end address, which thus define a first memory area MEMA_1. Generally, the register bank may also comprise further registers for specifying further memory areas and one or more of the data identifying a given memory area MEMA may be hardwired. In various embodiments, each memory region MEMA may also have associated a register for storing the index of the cryptographic key KEY0, KEY1, etc. to be used for the decryption of the respective memory area MEMA.

In the embodiment considered, the register bank 1106 comprises moreover one or more registers for storing data identifying the data to be processed.

For example, in various embodiments, the register bank 1106 comprises a plurality of registers DAT_1 . . . DAT_k for storing directly the data DATA to be processed by the cryptographic circuit 112.

Alternatively or additionally, the register bank 1106 may comprise one or more registers DADR_1 . . . DADR_1 for storing a memory (start) address, e.g. in the memory 114, containing the data to be processed. Generally, the register bank 1106 may also comprise a register for storing the amount of data to be processed.

In the embodiment considered, the various data stored to the register bank 1106 (i.e. the key registers, the data registers and/or the data address registers) are provided to the cryptographic processing circuit 112.

Specifically, in the embodiment considered, the cryptographic processing circuit 112 supports a plurality of processing operations, such as data encryption and decryption. Generally, the cryptographic processing circuit 112 may also support different modes, e.g. different chaining modes, such as Electronic Codebook (ECB), Cipher Block Chaining (CBC), Counter (CTR), etc. According in the embodiment, the register bank 1106 comprises at least one operation register OP for specifying the operation to be performed and possibly additional configuration data associated with the operation to be performed, such as the index of the cryptographic key to be used.

Accordingly, in the embodiment considered, the key registers KEY0_1 . . . KEY0_m, KEY1_1 . . . KEY1_m, etc., the optional key configuration register KEY_CFG and the optional memory area registers MEMA correspond to the first group of registers SET1 configured to store security configuration information. Conversely, the operation register OP and the data registers DAT_1 . . . DAT_k and/or the data address registers DADR_1 . . . DADR_1 correspond to the second group of registers SET2 configured to store data identifying the data to be processed and the processing operation to be performed.

Accordingly, in the embodiment considered, the bootloader firmware BL may be used to store one or more cryptographic keys to the key registers KEY0_1 . . . KEY0_m, KEY1_1 . . . KEY1_m, etc. Moreover, the bootloader firmware BL may set the lock signal LOCK (see FIG. 3b) in order to inhibit an access to the one or more cryptographic keys to the key registers KEY0_1 . . . KEY0_m, KEY1_1 . . . KEY1_m, etc. Generally, not all key registers KEY0_1 . . . KEY0_m, KEY1_1 . . . KEY1_m, etc. have to be "locked", but only those registers should be configured to inhibit read and preferably also write accesses, which have been programmed by the bootloader BL.

Accordingly, in various embodiments, the application firmware FW may perform cryptographic operations by: a) providing via the data registers DAT_1 . . . DAT_k or the address registers DADR_1 . . . DADR_1 data to the cryptographic processing circuit 112, and b) requesting via the operation register OP the execution of a given processing operation, such as data encryption or decryption, possibly specifying the index of a cryptographic key in the key register KEY0_1 . . . KEY0_m, KEY1_1 . . . KEY1_m, etc.

Conversely, in the architectures shown in FIGS. 2b and 2c, the bootloader firmware BL may also configure the memory area registers in order to signal that the application firmware FW is stored in encrypted form to a given memory area. Thus, when reading the application firmware FW via the cryptographic co-processor 108, the cryptographic processing circuit 122 will determine that the respective read requests access a memory area having stored encrypted data.

For example, the processor 102 may provide the address of a read operation to the cryptographic processing circuit 112 by storing the address to the address registers DADR_1 . . . DADR_1 of the register interface 110. Thus, the processing circuit 122 may analyse the address stored to the address registers DADR_1 . . . DADR_1 and decide whether the address belongs to a memory areas specified by the memory area registers MEMA.

Specifically, when the address does not belong to one of the memory areas, the cryptographic processing circuit 112 may forward the read request to the interface 106a, thereby reading the respective data from the memory 104/104b. Moreover, the data read from the memory 104/104b are provided to the processor 102 via the bus system 120.

Conversely, when the address belongs to one of the memory areas, the cryptographic processing circuit 112 may forward the read request again to the interface 106a, thereby reading the respective data from the memory 104/104b. However, in this case, the cryptographic processing circuit 112 decrypts the data read from the memory 104/104b and provides the decrypted data to the processor 102 via the bus system 120.

Generally, the use of the memory area registers MEMA is purely optional, because all data returned to read requests to addresses stored to the address registers DADR_1 . . . DADR_1 may be decrypted.

However, in the above embodiments, when some malfunctions occur, e.g. the encrypted data may not be decrypted, it is almost impossible to verify the origin of the malfunction. For example, due to the fact that the application firmware FW is not authorized to access neither the bootloader firmware BL nor the first set of registers SET1 (either because read access to the first set of registers SET1 is not possible or inhibited via the lock signal LOCK), the application firmware FW is unable to verify whether the bootloader firmware BL is wrong/corrupted or whether the wrong security configuration (as programmed to the set of registers SET1) has been used, e.g. whether the wrong cryptographic keys have been programmed. Moreover, in the architectures shown in FIGS. 2b and 2c, the application firmware FW may even not be decrypted at all, e.g. because the wrong cryptographic keys have been programmed or some configuration, e.g. the configuration of the memory area(s) MEMA is missing.

Figure 5A:
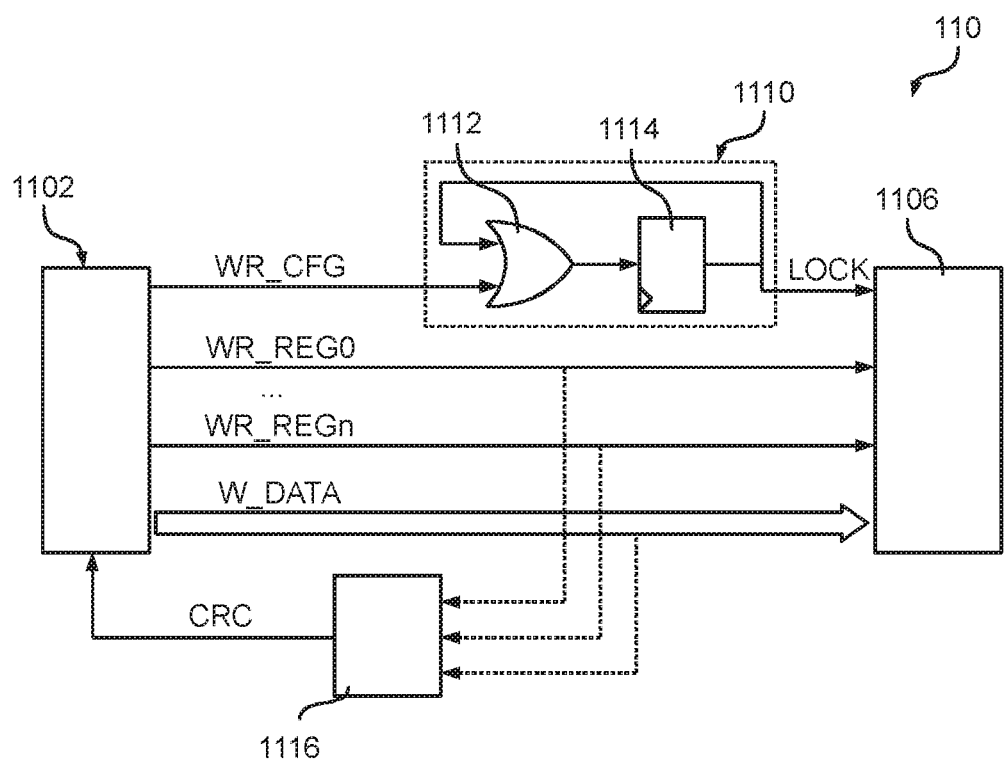
FIGS. 5a and 5b show further embodiments of the register interface of FIGS. 2a to 2c.

FIG. 5a shows an embodiment of the register interface 110 which permits to verify whether the security configuration stored to the first set of registers SET1 is correct.

Specifically, in the embodiment considered, the bus interface 1102 provides again the data W_DATA to be written to the register bank 1106 and register selection signals WR_REG0 . . . WR_REGn for selecting a respective register REG0 . . . REGn in the register bank 1106.

FIG. 5a shows also an embodiment for generating the lock signal LOCK. Specifically, in the embodiment considered, the bus interface 1102 is configured to provide a write and/or read configuration signal WR_CFG. For example, in various embodiments the signal WR_CFG comprises two bits SEL_CFG(0) and SEL_CFG(1) for setting the write and read configuration separately. For example, the signal WR_CFG may be generated as a function of the header data of the communications on the bus 120 or by associating a given address to the write and/or read configuration signal WR_CFG.

In the embodiment considered, the signal WR_CFG is provided to a storage circuit 1110, which is configured to generate the lock signal LOCK as a function of the signal WR_CFG.

For example, in the embodiment considered, the bus interface 1102 may only write data to the register bank 1106, but the bus interface 1102 is unable to read data from the register bank 1106. In this case, a single bit of the lock signal LOCK is sufficient in order to lock write access to the registers of the first set of registers SET1.

Specifically, in the embodiment considered, the signals WR_CFG and LOCK have the same number of bit. Moreover, in the embodiment considered, the storage circuit 1110 essentially implements a write-once storage element.

Specifically, each bit of the signal WR_CFG may be set to a first logic level (usually low) or a second logic level (usually high). Accordingly, once a given bit of the signal WR_CFG has been set to the second logic level, the respective bit of the lock signal LOCK is set and remains set, even when the value of the bit of the signal WR_CFG changes again to the first logic level. For example, assuming that a bit is set when the value of the bit is high, each bit of the lock signal LOCK and a corresponding bit of the signal WR_CFG may be provided to an OR gate 1112. Moreover, the output of the OR gate(s) 1112 is provided to a register 1114, which stores the value provided by the OR gate(s) 1112. Accordingly, once set a given bit of the register 1114 (corresponding to a respective bit of the lock signal LOCK), the value of the bit is maintained independently from the value of the corresponding bit of the signal WR_CFG.

In the embodiment considered, a further monitoring circuit 1116 has been added. Specifically, the monitoring circuit 1116 is configured to monitor the communication between the bus interface 1102 and the register bank 1106 and compute a control signal as a function of the data W_DATA provided to the register bank 1106. Specifically, in the embodiment considered, the monitoring circuit 1116 monitors for this purpose also the register selection signals WR_REG0 . . . WR_REGn in order to determine when the data W_DATA are valid.

For example, in various embodiments, the monitoring circuit 1116 is configured to calculate consecutively a CRC value as a function of the data W_DATA transmitted to the register bank 1106. Generally, the monitoring circuit 1116 may be configured to calculate the CRC not as a function of all data W_DATA but only as a function of the data W_DATA stored to the registers belonging to the first set of registers SET1 or a subset of the registers belonging to the set of registers SET1.

Accordingly, in the embodiment considered, the bootloader BL may store sequentially the bits of one or more cryptographic keys to the key registers KEY0_1 . . . KEY0_m, KEY1_1 . . . KEY1_m, etc., possibly set the optional further security configuration data KEY_CFG and/or the memory area configuration data MEMA, and set the lock signal LOCK, e.g. by setting the signal WR_CFG. While writing data to the register bank 1106, in particular the registers for storing the first set of configuration data SET1, the monitoring circuit 1116 will thus calculate the CRC value at least as a function of the bits of the cryptographic keys. As mentioned before, the value CRC may also be calculated for the configuration data KEY_CFG and/or MEMA. Generally, it is not required that the value CRC is calculated sequentially for all registers of the set SET1, but the value CRC could be calculated also only for subsets of the registers of the set SET1, e.g. by calculating the value CRC for the registers KEY0_1 to KEY0_m and calculating a new value CRC for the registers KEY1_1 to KEY1_m.

Accordingly, the bootloader firmware and/or application firmware FW may access the bus interface 1102 in order to read the value CRC and compare the value CRC with an expected value in order to determine whether a correct security configuration has been provided to the register bank 1106. Additionally or alternatively, the value CRC may also be read via a debug interface of the processing system 10a.

For example, in various embodiments, the CRC value has 8 bit. However also longer bit sequences and different calculations may be performed in order to compute a value of the bits of the security configuration information, such as a hashing function. However, the inventors have observed that the number of bits of the value CRC should not be too small in order to render the content of the signal CRC insignificant. Similarly, the number of bits of the value CRC should not be too high, thereby possibly providing information with respect to the value of the cryptographic keys. Thus, a signal CRC having between 8 and 128 bits, preferably between 8 and 32 bits, may be suitable for most cryptographic applications.

In various embodiments, the monitoring circuit 1116 may also limit access to the signal CRC via the bus interface 1102, thereby limiting a readback of the value CRC.

For example, in various embodiment, the monitoring circuit 1116 may disable the reading of the signal CRC when the lock signal LOCK has not been set. In fact, as mentioned before, the bootloader BL should set the lock signal LOCK once the security configuration has been provided to the register interface 112.

Additionally or alternatively, the monitoring circuit 1116 may monitor the register selection signals WR_REG0 . . . WR_REGn, in particular the signals associated with the registers of the set SET1, in order to determine whether the bits of the cryptographic keys have been written in the correct sequence. In fact, as mentioned before, the cryptographic keys have usually more bits than the registers in the register bank and plurality of key registers are required in order to store each cryptographic key. Similarly, the register bank may be configured to provide a plurality of cryptographic keys (see FIG. 4). Accordingly, the monitoring circuit 1116 may determine whether the key registers KEY0_1 . . . KEY0_m, KEY1_1 . . . KEY1_m, etc. have been written in the correct sequence. For example, the monitoring circuit 1116 may disable the reading of the signal CRC when the key registers have been written out-of-order, e.g. because the register KEY0_m has been written before the register KEY0_1 and/or the register KEY1_1 has been written before the register KEY0_1.

Accordingly, in the embodiment considered, the value CRC may be read only when the cryptographic keys have been configured via a given reference sequence of accesses to the register interface 110. Conversely, different write sequences of cryptographic keys from the expected sequence keep the value CRC secret. For example, in this case the monitoring circuit 1116 may provide a default value, e.g. having all bits set to "0".

Moreover, by using a value CRC with a limited number of bits, the value CRC cannot be used to retrieve the original cryptographic keys, thereby guaranteeing a high security standard.

Preferably, the register interface 110 is configured to disable write access (and if supported also read access) to the registers as a function of a lock signal LOCK, e.g. having a single bit, which when set to "1" disables further write accessed to the registers of the first set of registers SET1. Accordingly, incidental write operations by the application firmware FW to the key registers may be disabled.

Figure 5B:
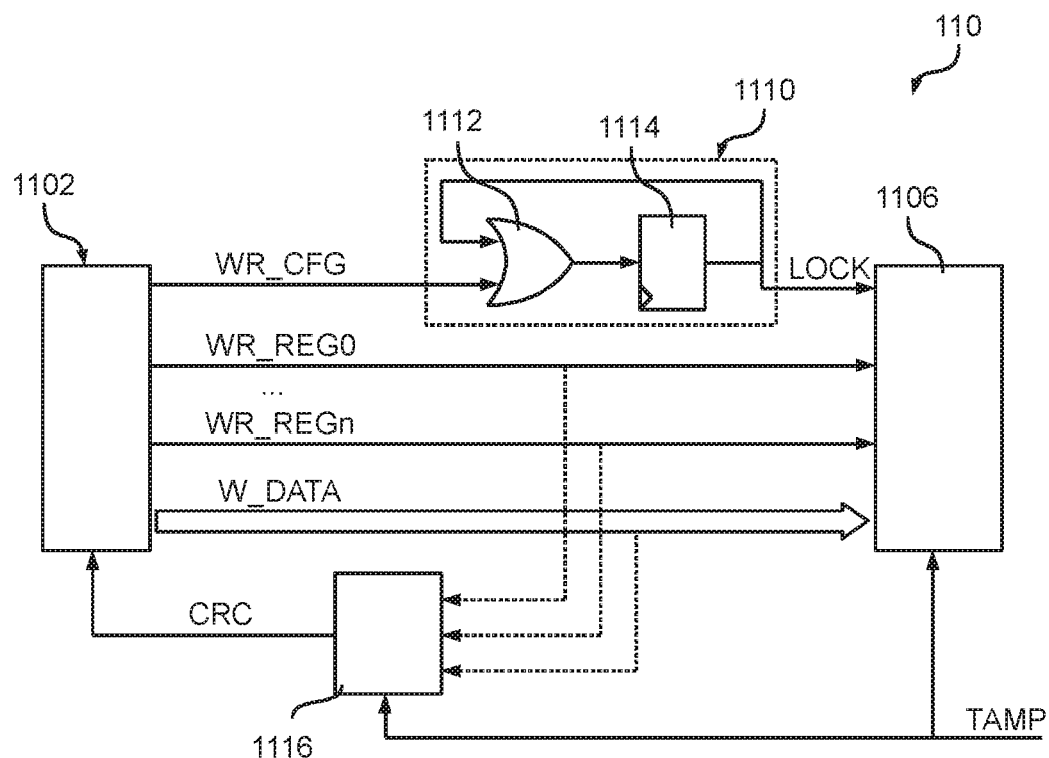

FIG. 5b shows an embodiment, wherein the processing system 10a comprises a tamper detection circuit configured to generate a tamper signal TAMP.

In this case, the monitoring circuit 1116 and/or the register bank 1106 may be configured to disable access to the stored data and/or reset the data, e.g. the registers of the register bank 1106 may be reset and the value CRC may be reset in response to the signal TAMP.

Figure 6:
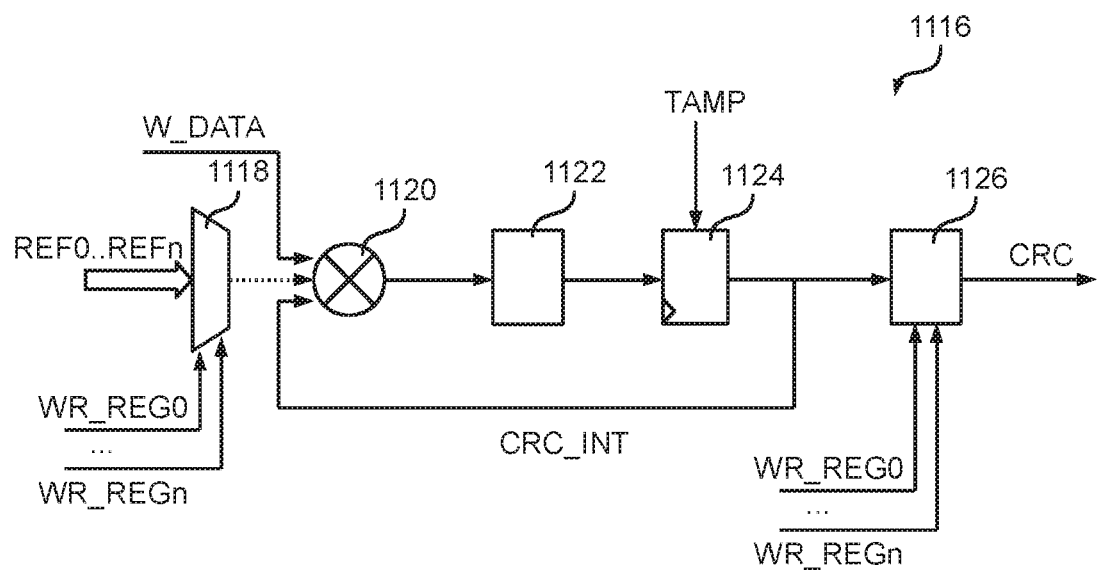
FIGS. 6 and 7 show an embodiment of a CRC calculation circuit for the register interfaces of FIG. 5a or 5b.

FIG. 6 shows an embodiment of the monitoring circuit 1116.

In the embodiment considered, the monitoring circuit 1116 comprises a cyclic redundancy check (CRC) calculation circuit 1120-1124 and a hide or masking circuit 1126.

Specifically, the CRC calculation circuit is configured to calculate an internal CRC signal CRC_INT as a function of the data signal W_DATA and the previous value of the internal CRC signal CRC_INT. For example, in the embodiment considered, the CRC calculation circuit comprises for this purpose: a set of XOR gates 1120 receiving at input the data signal W_DATA and the internal CRC signal CRC_INT; a combinational logic circuit 1122 configured to calculate a CRC value as a function of the signal at the output of the XOR gates 1120; and a register 1124 configured to provide the internal CRC signal CRC_INT by storing the CRC value calculated by the combinational logic circuit 1122 in response to a clock signal (not shown).

Accordingly, in the embodiment considered, the internal CRC value CRC_INT is calculated as a function of the data W_DATA and the value of the value CRC_INT at the previous clock cycle.

In various embodiments the XOR gates 1120 may receive (in addition to the signals W_DATA and CRC_INT) also a reference value. For example, in the embodiment shown in FIG. 6, the monitoring circuit 1116 comprises a multiplexer receiving at input a plurality of reference signals REF0 . . . REFn corresponding to the number of register selection signals WR_REG0 . . . WR_REGn monitored by the monitoring circuit 1116.

Moreover, in the embodiment considered, the monitoring circuit 1116 comprises a multiplexer for selecting one of these reference signals REF0 . . . REFn as a function of the register selection signals WR_REG0 . . . WR_REGn, e.g. the reference signal REF0 when the register selection signal WR_REG0 is set to high, etc.

In general, the reference signals REF0 . . . REFn may be hardwired or stored in register programmable by the processor 102.

For example, the reference signals REF0 . . . REFn may be useful when the data signal W_DATA and the CRC value CRC_INT have a different number of bits. For example, as mentioned before the data signal W_DATA may have 32 bits, while the CRC value CRC_INT may have only 8 bit. In this way, the selected reference signal may be used to fill at least in part the missing bits of the data signal W_DATA or the CRC value CRC_INT. For example, in various embodiments, 32 XOR gates 1120 are used, which may receive at input: the 32 bits of the data signal W_DATA(31:0); and a 32-bit sequence composed of the selected reference signal REFX and the CRC value CRC_INT, e.g.: REFX(7:0) & CRC_INT(7:0) & REFX(7:0) & CRC_INT(7:0) for a reference signal having 8 bits.

Accordingly, in this case the combinational logic circuit 1122 may combine the signals at the output of the XOR gates 1120 (having e.g. 32 bit) and determine a signal having the number of bits of the CRC value CRC_INT. For example, in various embodiments, the combinational logic circuit 1122 computes an 8-bit CRC value in line with the Asynchronous Transfer Mode (ATM) protocol.

The hide or masking circuit 1126 is configured to selectively set the signal CRC to the internal signal CRC_INT.

Accordingly, in the embodiment considered, the CRC calculation circuit comprised of the blocks 1118, 1120, 1122 and 1124 provides an internal CRC value calculated as a function of the data signal W_DATA. However, this value is not provided directly to the bus interface, but a hide or masking circuit is configured to selectively forward the signal CRC_INT to the bus interface or mask the signal CRC_INT, e.g. by providing a default value.

Specifically, in the embodiment considered, the circuit 1126 is configured to monitor the register selection signals WR_REG0 . . . WR_REGn, in particular the register selection signals associated with the registers of the first set of registers SET1 in order to determine whether the security configuration data have been written in the correct sequence to the register bank 1106.

Figure 7:
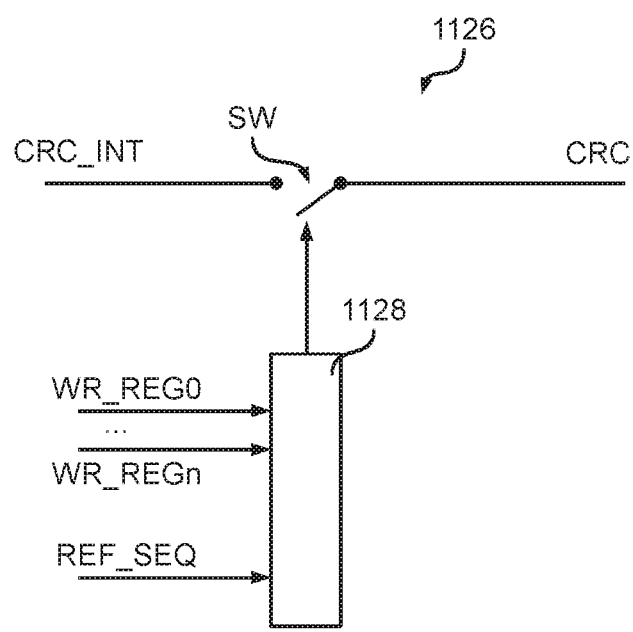

For example, FIG. 7 shows an embodiment of the masking circuit 1126.

In the embodiment considered, the circuit 1126 schematically comprises a switch SW driven by a finite state machine (FSM) 1128 in order to selectively set the signal CRC to the signal CRC_INT.

In the embodiment considered, the FSM 1128 is configured to monitor the register selection signals WR_REG0 . . . WR_REGn in order to determine the write sequence and compare the write sequence with a reference sequence REF_SEQ. For example, in various embodiments, the FSM 1128 is configured to the set signal CRC via the switch SW to the signal CRC_INT when the registers of the first set SET1, in particular the register for storing the cryptographic keys, have been written with the requested sequence REF_SEQ.

For example, in a practical implementation, the switch SW may be implemented with a register or latch, which is selectively enabled to store the value CRC_INT. Accordingly, in this case, a given address may be associated with the register/latch storing the value CRC and the value CRC may be read by performing a read request to the address associated with the register/latch storing the value CRC. For example, this solution may be suitable, when buffered write communications are used (e.g. AMBA AXI-3,4 bus standard). In this case, the processor 102 may verify the completion of the configuration phase by periodically performing a read request to the address associated with the register/latch storing the value CRC.

Additionally or alternatively, the register interface 110 may automatically return the value CRC when the sequence of register selection signals WR_REG0 . . . WR_REGn corresponds to the reference sequence REF_SEQ. For example, when using an AHB bus 120, the value CRC may be returned in the header data of the packet returned in response to the write requests of the last register in the reference sequence REF_SEQ.

Generally, also the reference sequence REF_SEQ may be hardwired or stored in registers programmable by the processor 102. For example, when using a hardwired reference sequence REF_SEQ, the circuit 1126 may be implemented with a finite state machine which proceeds through a given number of states in response to the register selection signals WR_REG0 . . . WR_REGn. Specifically, if the register selection signals WR_REG0 . . . WR_REGn are set in the correct sequence, the state machine evolves sequentially through a sequence of states. Generally, the value CRC may correspond in this case to the value CRC_INT or the value CRC may only be set to the value CRC_INT once the complete sequence of security configuration data has been written and/or the lock signal LOCK has been set.

Conversely, if the register selection signals WR_REG0 . . . WR_REGn are set in the incorrect sequence, the state machine may perform a transition to an error state in which the signal CRC is set to a default value. Generally, the default value may be any value being independent from the value CRC_INT. Accordingly the default value may not be necessarily a fixed value, e.g. having all bits set to "o", but the default value may also be a random value.

In the embodiment considered, it is thus possible to verify the correctness of security configuration by comparing the calculated CRC value CRC with an expected/reference CRC value. For example, when the CRC values correspond, the security configuration of the co-processor 108 may be assumed to be correct and possible malfunctions may be found outside the coprocessor 108, e.g. in the application firmware FW.

In various embodiments, the finite state machine 1128 may also monitor the number of configurations of the first set of registers SET1, in particular the number of configurations using an incorrect sequence REF_SEQ, which may be an indicator for a brute force attempts to retrieve the correct sequence. For example, in various embodiments, once the FSM 1128 determines that a given maximum number of incorrect configurations has been performed, the finite state machine 1128 may trigger a lock inhibiting further access to the value CRC_INT and/or locking the register bank 1106. Similarly, the finite state machine 1128 may also monitor the number of configuration of the first set of registers SET1, which use the correct sequence REF_SEQ. For example, in various embodiments, once the FSM 1128 determines that a given maximum number of correct configurations has been performed, the state machine 1128 may trigger a lock inhibiting further access to the value CRC_INT and/or locking the register bank 1106. Accordingly, in the embodiment considered, further configurations may be performed by resetting the processing system 10*a*, thereby resetting the temporarily stored value of the number of correct and/or incorrect configurations. In general, the number of correct and/or incorrect configurations may also be store in a permanent manner.

Of course, without prejudice to the principle of the invention, the details of construction and the embodiments may vary widely with respect to what has been described and illustrated herein purely by way of example, without thereby departing from the scope of the present invention, as defined by the ensuing claims.

For example, while the previous embodiments relate to security configuration data of a cryptographic co-processor 108, the register interface 110 described in the foregoing may also be used in combination with other coprocessors in which a first set of configuration data SET1 has to be kept secret, while the possibility should be given to verify whether the correct configuration data have been stored to the register interface.

Moreover, in the embodiments described in the foregoing, the security configuration data are stored to the first set of registers SET1 via a bootloader firmware executed by the processor 102. However, in general, the configuration of the first set of registers SET1 may also be performed by a dedicated hardware module, which e.g. reads the respective configuration data directly from the non-volatile memory 104 (FIGS. 2*a* and 2*b*) or 104*a* (FIG. 2*c*).

What is claimed is:

1. A processing system comprising:
   a non-volatile memory configured to store a firmware to be executed by a processor coupled to a bus system;
   a co-processor coupled to the bus system, wherein the co-processor comprises a register interface comprising a plurality of registers and a processing circuit configured to perform a processing operation as a function of data stored in the plurality of registers, wherein the plurality of registers comprise a first set of registers configured to store a first set of configuration information and a second set of registers configured to store a second set of configuration information, wherein the register interface comprises:
      a bus interface configured to monitor write requests transmitted via the bus system to the register interface, wherein the write requests comprise a target address and data to be written, wherein each register of the plurality of registers is associated with a respective address, wherein the bus interface is configured to set for each register of the plurality of registers a respective register selection signal when the target address of a write request corresponds to the address associated with the respective register, wherein each register is configured to store the data to be written when the respective register selection signal is set;
      a cyclic redundancy check calculation circuit configured to compute a cyclic redundancy check value as a function of the data to be written to the first set of registers; and
      a masking circuit configured to:
         monitor the register selection signals associated with the registers of the first set of registers in order to determine a sequence of registers to which data has been stored;
         compare the sequence of registers with a reference sequence;
         when the comparison indicates that the sequence of registers corresponds to the reference sequence, providing the computed cyclic redundancy check value to the bus interface; and
         when the comparison indicates that the sequence of registers does not correspond to the reference sequence, providing a value being independent from the computed cyclic redundancy check value to the bus interface.

2. The processing system according to claim 1, wherein the cyclic redundancy check calculation circuit comprises:
   a register or latch for storing the computed cyclic redundancy check value;
   an XOR gate configured to generate a signal by combining the data to be written to the first set of registers and the cyclic redundancy check value stored in the register or latch; and
   a combinational logic circuit configured to generate the computed cyclic redundancy check value as a function of the signal generated by the XOR gate.

3. The processing system according to claim 2, wherein the cyclic redundancy check calculation circuit comprises a multiplexer for selecting a reference signal as a function of the register selection signals, and wherein the XOR gate is configured to generate the signal by combining the data to be written to the first set of registers, the cyclic redundancy check value stored in the register or latch and the selected reference signal.

4. The processing system according to claim 1, wherein the processing circuit is a cryptographic processing circuit configured to perform cryptographic operations as a function of at least one cryptographic key, and wherein the first set of registers is configured to store the at least one cryptographic key.

5. The processing system according to claim 4, wherein the non-volatile memory is arranged to store a bootloader firmware configured to store a cryptographic key to the first set of registers.

6. The processing system according to claim 4, wherein the second set of register comprises:
   a register for storing the data to be processed by the cryptographic processing circuit; and/or
   a register for storing an address containing the data to be processed by the cryptographic processing circuit.

7. The processing system according to claim 6, wherein the co-processor has associated a communication interface for interfacing a memory with the bus system, wherein the co-processor is configured to
   analyze the communication exchanged between the memory and the bus system via the communication interface in order to detect a write operation to a given memory location belonging to a given memory area of the memory, and
   encrypt the data received with the write operation with a cryptographic key stored in the first set of registers and store the encrypted data via the communication interface to the given memory location.

8. The processing system according to claim 6, wherein the co-processor has associated a communication interface for interfacing a memory with the bus system, wherein the co-processor is configured to analyze the communication exchanged between the memory and the bus system via the communication interface in order to detect a read operation to a given memory location belonging to a given memory area of the memory, read via the communication interface the data stored at the given memory location from the memory and decrypt or encrypt the data read with a cryptographic key stored in the first set of registers.

9. The processing system according to claim 8, wherein the memory corresponds to the non-volatile memory or a further non-volatile memory, and the memory area corresponds to a memory area for storing an application firmware to be executed by the processor.

10. The processing system according to claim 1, wherein the register interface is configured to selectively inhibit write and/or read accesses to the first set of registers as a function of a lock signal.

11. An integrated circuit comprising:
a register interface comprising a plurality of registers,
a bus interface configured to
monitor write requests transmitted to the register interface, wherein the write requests comprise a target address and data to be written,
receive the data to be written to the plurality of registers and register selection signals for selecting a respective register in the plurality of registers; and
a monitoring circuit configured to monitor the register selection signals between the bus interface and the plurality of registers in order to determine when the data to be written to the plurality of registers is valid, wherein the monitoring circuit is configured to
compute a cyclic redundancy check value as a function of the data to be written, and
determine when the data to be written to the plurality of registers is valid by verifying the cyclic redundancy check value, and
limit access to the cyclic redundancy check value.

12. The integrated circuit according to claim 11,
wherein each register of the plurality of registers is associated with a respective address, wherein the bus interface is configured to set for each register of the plurality of registers a respective register selection signal when the target address of a write request corresponds to the address associated with the respective register, wherein each register is configured to store the data to be written when the respective register selection signal is set; and
wherein the monitoring circuit is configured to
monitor the register selection signals associated with the plurality of registers in order to determine a sequence of registers to which data has been stored;
compare the sequence of registers with a reference sequence;
when the comparison indicates that the sequence of registers corresponds to the reference sequence, providing the cyclic redundancy check value to the bus interface; and
when the comparison indicates that the sequence of registers does not correspond to the reference sequence, providing a value being independent from the cyclic redundancy check value to the bus interface.

13. A micro-controller comprising the integrated circuit according to claim 11.

14. A method of operating a processing system comprising:
storing data to a first set of registers of a register interface via a bus interface, wherein the register interface comprises a plurality of registers, wherein the register interface comprises the bus interface configured to monitor write requests transmitted via a bus system to the register interface, wherein the write requests comprise a target address and data to be written, wherein each register of the plurality of registers is associated with a respective address, wherein the plurality of registers comprise the first set of registers configured to store a first set of configuration information and a second set of registers configured to store a second set of configuration information;
computing a cyclic redundancy check value as a function of the data stored to the first set of registers;
monitoring register selection signals associated with the registers of the first set of registers in order to determine a sequence of registers to which data has been stored;
comparing the sequence of registers with a reference sequence; and
when the comparing indicates that the sequence of registers corresponds to the reference sequence, obtaining the computed cyclic redundancy check value via the bus interface.

15. The method of claim 14, further comprising:
at the bus interface, setting, for each register of the plurality of registers, a respective register selection signal when the target address of a write request corresponds to the address associated with the respective register; and
at each register, storing the data to be written when the respective register selection signal is set.

16. The method of claim 14, further comprising:
when the comparison indicates that the sequence of registers does not correspond to the reference sequence, obtaining a value being independent from the computed cyclic redundancy check value via the bus interface.

17. The method of claim 14, further comprising:
analyzing a communication exchanged between a memory and a bus system via a communication interface in order to detect a write operation to a given memory location belonging to a given memory area of the memory, and
encrypting the data received with the write operation with a cryptographic key stored in the first set of registers and storing the encrypted data via the communication interface to the given memory location.

18. The method of claim 14, further comprising:
storing the computed cyclic redundancy check value at a register or latch;
generating a signal by combining the data to be written to the first set of registers and the cyclic redundancy check value stored in the register or latch at an XOR gate; and
generating the computed cyclic redundancy check value as a function of the signal generated by the XOR gate at a combinational logic circuit.

19. The method according to claim 18, further comprising
receiving, at an input of a multiplexer, a plurality of reference signals corresponding to the number of register selection signals being monitored;
at the multiplexer, selecting one of the plurality of reference signals as a function of the register selection signals; and
generating, at the XOR gate, the signal by combining the data to be written to the first set of registers, the cyclic redundancy check value stored in the register or latch and the selected reference signal.

\* \* \* \* \*